A. AMUNDSON.
HANDLE FOR CROSSCUT SAWS.
APPLICATION FILED DEC. 15, 1915.
1,268,664.
Patented June 4, 1918.
2 SHEETS—SHEET 1.
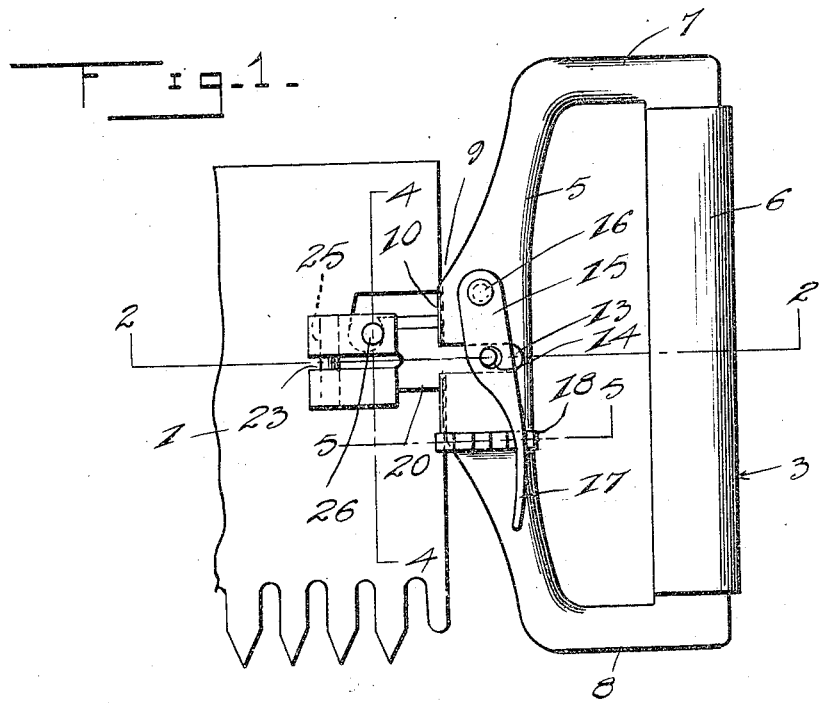
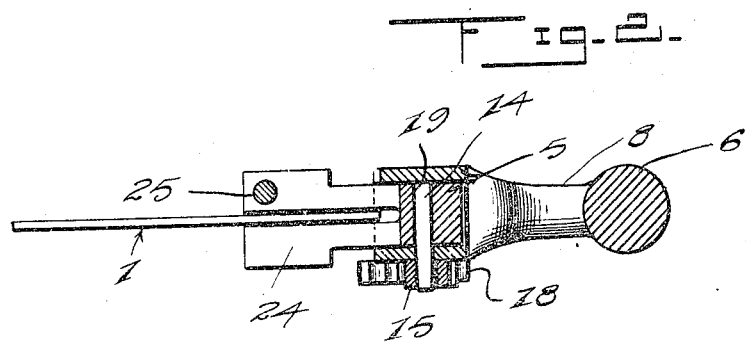
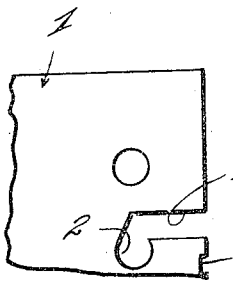
Witnesses
Inventor
A. Amundson.
By
Attorney

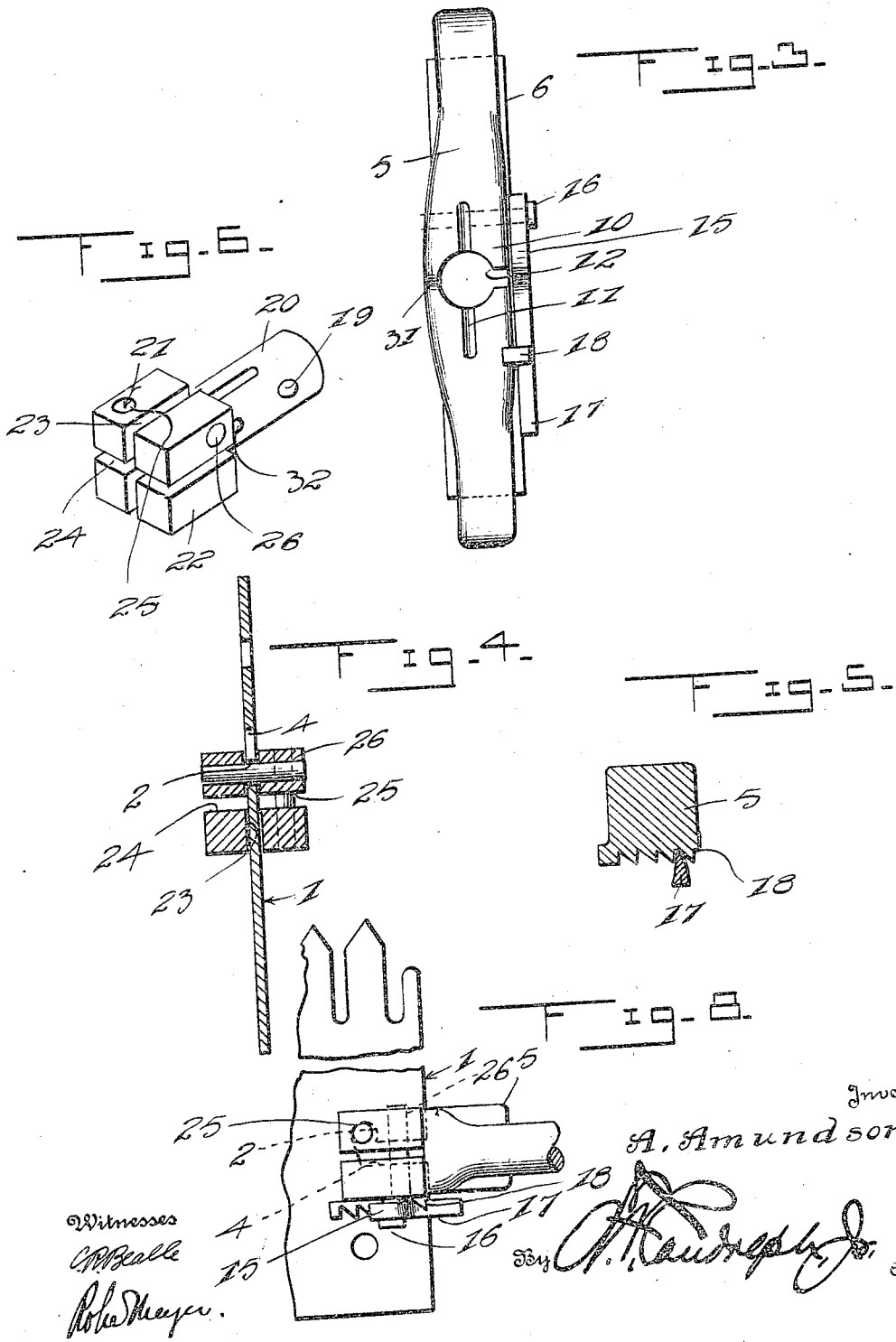

UNITED STATES PATENT OFFICE.

AMUND AMUNDSON, OF BELLINGHAM, WASHINGTON.

HANDLE FOR CROSSCUT-SAWS.

1,268,664.   Specification of Letters Patent.   Patented June 4, 1918.

Application filed December 15, 1915. Serial No. 66,971.

*To all whom it may concern:*

Be it known that I, AMUND AMUNDSON, a subject of the King of Norway, residing at Bellingham, in the county of Whatcom and State of Washington, have invented certain new and useful Improvements in Handles for Crosscut-Saws; and I do hereby declare the following to be a full, clear, and exact description of the invention, such as will enable others skilled in the art to which it appertains to make and use the same.

This invention relates to a handle for use upon cross-cut saws, and the primary object of the invention is to provide a handle structure which may be quickly and easily attached to or detached from the end of the saw for permitting the quick withdrawal of a saw from a kerf, in a tree, when felling the tree for preventing the kinking of the saw by the tree.

Another object of this invention is to provide a saw handle which has an adjustably supported saw engaging member carried thereby, which saw engaging member is provided with a pair of grooves cut therein, so as to permit of the attachment of the saw handle parallel with the saw blade or at right angles thereto, as desired.

A further object of this invention is to provide a saw blade having a novel shaped pin receiving opening formed in its ends, by means of which the saw handle is attached to the blade, which opening comprises a substantially circular opening having a passage way communicating therewith and with the end of the saw blade, for facilitating the quick and easy attachment to or detachment from the saw blade of the handle structure.

A further object of this invention is to provide in a saw handle structure, an adjustably supported saw engaging member, which is connected to a lever, pivotally carried by the saw handle and to provide a rack upon the saw handle for engagement with a lever for holding it in various adjusted positions.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of a fragment of a saw blade showing the improved handle attached thereto.

Fig. 2 is a sectional view on the line 2—2 of Fig. 1.

Fig. 3 is an end view of the saw handle showing the saw blade engaging member removed.

Fig. 4 is a section on the line 4—4 of Fig. 1.

Fig. 5 is a section on the line 5—5 of Fig. 1.

Fig. 6 is a perspective view of the saw blade engaging member, and

Fig. 7 is a fragmentary view of one end of a cross-cut saw, showing the improved form of opening cut therein for facilitating the attachment of the handle to the saw blade.

Fig. 8 is a view showing the blade attached to the handle, the said handle extending transversely to the blade.

Referring more particularly to the drawings, 1 designates a fragment of a cross-cut saw of any ordinary construction, which has an opening 2 extending therethrough, a short distance inwardly of its ends, which opening is provided for permitting of the attachment of a handle structure generically indicated by the numeral 3 to the end of the saw blade. The saw blade 1 is provided with a longitudinally extending passageway 4 which extends inwardly from the end of the saw and communicates with the opening 2 as is clearly shown in Fig. 7 of the drawings. The handle structure 3, includes a bracket or frame 5 which has a cylindrical wooden handle secured thereto and attached to the end of the arms 7 and 8 of the bracket structure. The main body 9 of the bracket structure 5 of the handle 3 is slightly enlarged to form a shoulder as is indicated at 10, against which the edge of the end of the saw blade 1 abuts as is clearly shown in Fig. 1 of the drawings. The shoulder 10 of the saw handle is provided with a groove 11 formed therein, in which the edge of the saw blade seats.

The body 9 of the handle bracket 5 is provided with an opening 12 extending therethrough, and it has a slot 13 formed therein and extending inwardly from the outer edge or shoulder 10 toward the inner edge of the side of the body 9. The groove 13 communicates with the substantially circular opening 12 and forms a guide for a pin 14, which extends through a lever 15 which is pivotally connected as is shown at 16 to a body 9. The handle 17 of the lever 15 is reduced in width and projects across a plurality of rack teeth shown at 18 which are formed upon the bracket 5. The handle end 17 of the lever 15 has its sides converging so as to form a substantially wedge-shaped handle in cross section, which will fit snugly between any of the teeth 18 as is clearly shown in Fig. 5. The pin 14 extends through an opening 19 which is formed in the circular shank 20 of the saw blade engaging member 21. The shank 20 is circular in cross section and is slidably seated in the opening 12. A rectangular head 22 is formed upon the outer end of the shank 20 and it is provided with a vertically extending slot 23 and a horizontal slot 24 which seats at the center or axis of the block as is clearly shown in Fig. 6 of the drawings. Pins 25 and 26 extend vertically and horizontally through the rectangular head 22 respectively and they are adapted for seating in the openings 2 for connecting the handle to the saw blade 1.

In attaching the handle structure 3 to the saw blade 1, so that the handle will extend parallel to the saw blade, the handle is positioned so that the saw blade will be inserted in the vertical slot 23, and the pin 26 will travel in the passageway 4, after which the handle is moved inwardly toward the saw blade until the pin reaches the inner terminal of the passageway 4, after which the handle is moved downwardly a comparatively short distance, seating the pin 26 in the opening 2. The lever 15 is then moved rearwardly, to the limit of its movement, and until the end of the saw blade is firmly seated within the groove 11 after which the lever is moved inwardly toward the bracket 2, and engaged by one of the teeth 18, which securely holds the lever in its adjusted position and securely clamps the end of the saw blade against the shoulder 10.

When it is desired to position the saw blade at right angles to the handle, which position is sometimes desired in the felling of trees, the saw blade is positioned in a horizontal slot 24 and the vertical pin 25 is positioned within the opening 2 after which the lever 15 is moved rearwardly for causing the notch 30 to be formed in the end of the saw blade below the passage-way 4, to engage a portion 31 of the shoulder 10 and causes the edge of the blade to be clamped against the portion 31 and the inner wall 32 on the horizontal slot 24, which securely clamps the saw blade in its proper position at right angles to the handle 6 of the handle structure 3. The lever 15 is then moved so that it will be in engagement with one of the teeth 18 for preventing accidental disconnection between the handle and the saw blade.

From the foregoing description taken in connection with the accompanying drawings the advantages of construction and of the method of operation of the improved handle for cross-cut saws will be readily apparent to those skilled in the art to which this invention appertains, and, while in the foregoing description, the principle of the operation of this invention has been described together with various features of construction, it is to be understood that certain minor features of construction combination and arrangement of parts may be altered to suit practical conditions provided such alterations are comprehended within the scope of what is claimed.

What is claimed is:—

The combination with a saw blade having an approximately L-shaped slot, of a plunger consisting of a head having saw-blade receiving slots arranged at right angles, and a round outer portion, pins extending across the slots of the head for engaging the slot of the saw blade, a handle composed of an inner attaching portion and an outer grip portion connected at its ends to the attaching portion, the latter having a central opening to receive the round portion of the plunger and provided with a saw blade receiving groove and, said attaching portion being also provided with a central slot at one side of the opening, a projection carried by the plunger and operating in the slot of the said attaching portion of the handle, a lever extending along the said attaching portion and crossing the slot and provided thereat with an opening receiving said projection, said lever being pivoted at one side of the slot, and a ratchet bar mounted on the said attaching portion at the opposite side of the slot and engaged by the said lever.

In testimony whereof I affix my signature in presence of two witnesses.

AMUND AMUNDSON.

Witnesses:
 CHAS. A. SATHER,
 LILLIAN LEHMAN.